Aug. 16, 1960     A. P. DREDSKE ET AL     2,949,144
BODY AND FENDER STRAIGHTENER
Filed Aug. 7, 1958
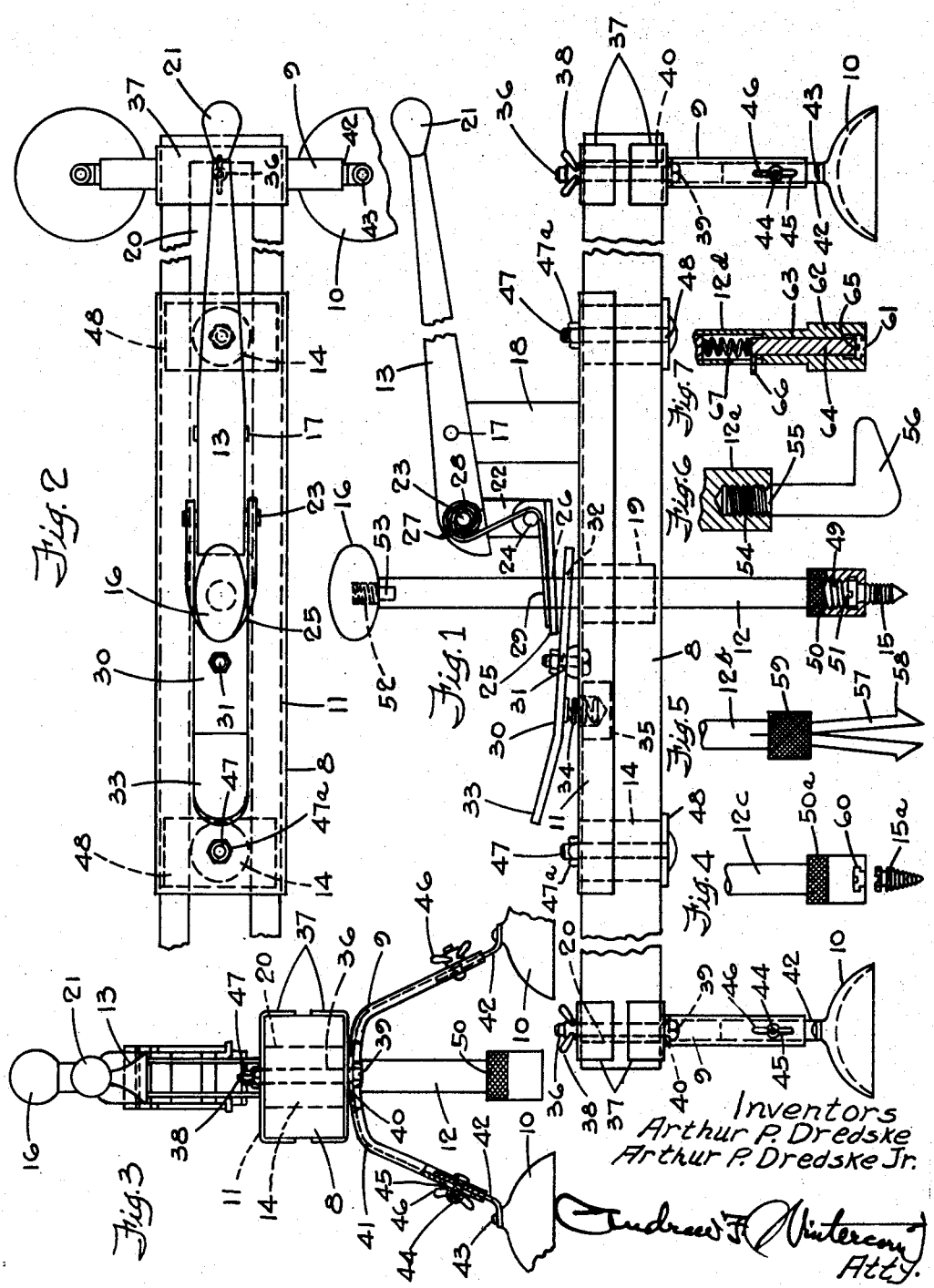

United States Patent Office 2,949,144
Patented Aug. 16, 1960

2,949,144

BODY AND FENDER STRAIGHTENER

Arthur P. Dredske and Arthur P. Dredske, Jr., both of 9912 N. 2nd St., Rockford, Ill.

Filed Aug. 7, 1958, Ser. No. 753,815

13 Claims. (Cl. 153—38)

This invention relates to a body and fender straightener for motor vehicles.

The principal object of our invention is to provide a quickly and easily universally adjustable device of the kind mentioned to facilitate the pulling out of dented in portions on any part of a car or truck, the device, briefly stated, consisting of:

(1) A light but strong portable supporting frame of elongated form having easily adjustable supporting legs on the opposite ends equipped with rubber suction cups as the work engaging feet, for non-marring and non-slipping support of the device anywhere on the work in the vicinity of the damaged portion to be repaired;

(2) A support or saddle for a pull-out rod and its operating means slidably guided on the frame for movement lengthwise of the frame to the bashed-in portion, where a fastener on the end of the rod is readily connectible to the work preliminary to the straightening operation, and (3) An oscillatable lever pivotally mounted on the support having a novel one-way friction clutch connection at one end with the pull-out rod, so that the pull stroke of the rod may be varied widely to suit every need, the guide also carrying another one-way friction clutch connection with the rod to hold the rod and the work with it against return movement after each working stroke of the lever, these two friction clutch means being so constructed and arranged that the manual release of the last mentioned friction clutch serves also to release the first mentioned friction clutch, so that as the operator with one hand holds the clutches released he can with his other hand manipulate the pull-out rod in the initial stages as well as in the final stages of a straightening job.

The invention is illustrated in the accompanying drawing, in which—

Fig. 1 is a side view of a body and fender straightener made in accordance with our invention, intermediate portions of the frame being broken away at both ends to conserve space and permit showing all parts on a larger scale;

Fig. 2 is a top view, with one end portion broken away to conserve space in the drawing;

Fig. 3 is an end view, and

Figs. 4–7 are illustrations of various forms of work attaching means for use on the end of the pull-out rod, other than the work attaching means shown in Fig. 1.

Similar reference numerals are used to designate corresponding parts in these views.

Referring to Figs. 1–3, the reference numeral 8 designates the elongated supporting frame of light but fairly strong construction so as to be easily portable, 9 are the adjustable supporting legs on the opposite ends, equipped with rubber suction cups 10 as the work engaging feet, for non-marring as well as non-slipping support of the device anywhere on the work wherever a damaged portion requires repair, 11 is the support or saddle for the pull-out rod 12 and its operating means 13 slidably guided, as indicated at 14, on the frame 8 for movement lengthwise of the frame to the bashed-in portion of the work, where a fastener 15 on the lower end of the rod 12 is readily screwed into or otherwise connectible to the work by turning the rod by means of its knob 16 preliminary to the straightening pull-out operation. The operating means 13 for the rod 12 is an oscillatable elongated lever pivoted near one end, as at 17, on a post 18 on the support 11, and the rod 12 is slidable freely and also rotatable in a vertical bearing 19 rigid with the support 11 and movable freely in the longitudinal guideway 20 in frame 8 with the guiding elements 14. Lever 13 has an operating handle or knob 21 on one end and has on its other end a link 22 pivotally mounted at one end, as at 23, and pivotally connected at its other end, as at 24, to a one-way friction clutch shoe 25, in which a hole 26 is provided receiving the rod 12 for its endwise movement in either direction, for its endwise adjustment, and for upward or outward pull in the one-way clutching action of the shoe. A grasshopper type spring 27 has coils 28 mounted on the opposite ends of the pivot pin 23 and has arms 29 on the ends thereof extending behind and under the ends of the pivot pin 24 and engaging the top of the shoe 25, urging it downwardly toward clutching position relative to the rod 12. Another one-way friction clutch shoe in the form of an elongated lever 30 is pivoted intermediate its ends, as at 31, on the support 11, and has a hole 32 provided in one end portion receiving the rod 12 for its endwise movement in either direction, for its endwise adjustment, and for holding the rod against return movement after it has been pulled upwardly or outwardly by means of shoe 25. A handle 33 is provided on the outer end of lever 30, and a coiled compression spring 34 is compressed between the lever 30 and a socket 35 on the support 11 urging the lever 30 toward clutching position relative to the rod 12. The lever 30 is oppositely inclined relative to shoe 25 and, hence, if the handle 33 is depressed with one hand to release the lower clutch, the shoe 25 is raised also to release the upper clutch, and rod 12 is therefore free to be moved endwise with the other hand in either direction or turned in either direction.

The inverted U-shaped legs 9 are pivotally and slidably adjustably connected to the frame 8 each by means of a bolt 36 and a pair of U-shaped yokes 37, the latter slidable on the top and bottom of the frame lengthwise thereof and having registering holes in the centers thereof receiving the bolt, which extends through the guideway 20, a wing nut 38 threaded on the projecting upper end of the bolt serving when tightened to clamp the yokes 37 on the frame in their slidably adjusted position and also clamp the leg 9 in its adjusted position relative to the lower yoke. The legs 9 are formed from channel strip material, and the hexagonal heads 39 of the bolts 36 fit between the flanges thereof to prevent turning of the bolts. Slots 40, lengthwise of the web of the channels of legs 9 in the arcuately bent middle portion 41 of the legs 9, have the head ends of the bolts 36 extending therethrough, allowing the legs 9 to be adjusted transversely relative to the frame 8 to suit different requirements in the mounting of the device in different places on a car or truck. The legs 9 are, of course, also slidably adjustable toward or away from one another lengthwise of the frame, and are also pivotally adjustable relative to the frame to suit requirements. For further adjustability of the legs to suit requirements, the suction cups 10 are adjustable relative to the ends of legs 9 on arms 42 that are fastened at one end, as at 43, to the center of the cups 10, and have their other ends slidable endwise in the troughs of the channels of the legs and arranged to be fastened in adjusted relationship to the legs 9 by bolts 44 which extend through slots 45 in the web of the channels lengthwise thereof, wing nuts 46 threaded on the outer ends of the bolts serving to clamp the arms 42 in adjusted position, giving the legs 9 the desired smaller or greater length to suit any given requirements.

Bolts 47 serve to fasten the cylindrical guide elements 14 to the bottom of the web of the inverted channel forming the support 11, and serve also to hold the cross-pieces 48 in retaining position against the bottom of the frame 8 to provide enough frictional drag to hold the support 11 in any given position of adjustment. The nuts 47a on bolts 47 can be adjusted to decrease or increase the friction drag.

The screw 15 for connection with the work (where a hole can be pierced in the dented portion, if necessary, to permit entry of the screw, and later soldered closed again) is fastened to the threaded lower end 49 of the rod 12 by means of an internally threaded cap 50, the screw being fixed against turning relative to the rod by means of a key projection 51 on the flat lower end of the rod which enters the screw-driver slot in the head of the screw.

Different jobs may require different connections for the rod 12 with the work than that obtainable with screw 15 shown in Fig. 1, so we may have the knob 16 removably threaded on the threaded reduced upper end portion of the rod, as seen at 52, and may provide flats 53 on this end of the rod to permit application of a wrench to hold the rod against turning when the knob 16 is to be removed and is later replaced and must be tightened. Thus, the rod 12 can be removed readily and another cylindrical rod 12a, like that shown in Fig. 6, can be substituted (of the same diameter as rod 12) having an internally threaded bore 54 in the lower end to receive the threaded upper end portion 55 of the shank of a hook shaped adapter 56 adapted to take hold of the work. Various sizes of hooks 56 may be provided in a set, all usable interchangeably on the rod 12a.

Another cylindrical rod 12b (Fig. 5) may be provided of the same diameter as rods 12 and 12a for use interchangeably in the present device, this rod having diverging spring tines 57 on the lower end with shoulders 58 on their ends to take hold of the work on opposite sides of a hole therein, the ends of the tines being adjustable to different spaced relationship to suit different requirements by slidable adjustment of the sleeve 59 along their shank portions.

Fig. 4 shows still another cylindrical rod 12c of the same diameter as rods 12—12b and usable interchangeably therewith, this one having a lateral opening 60 in one side of the cap 50a that is threaded on the lower end of the rod, so that the hexagonal head of the tapered screw 15a may be entered sidewise into the cap under the end of the rod and fastened in place by the tightening of the cap, instead of the cap having to be removed and assembled with the screw and then screwed onto the end of the rod, as in the case of cap 50 in Fig. 1.

Fig. 7 shows still another cylindrical rod 12d of the same size as rods 12—12c for use interchangeably therewith, this one having a T slot 61 in the enlarged lower end 62 to receive the head of a screw like 15 or 15a, or any other attachment, the rod having an axial bore 63 therein with a spring-pressed plunger 64 reciprocable therein to hold the screw or other attachment by its head by a key 65 on the end engageable in the screw-driver slot in the head, as in Fig. 1, the plunger 64 being disengageable from the slot by upward pull on its handle 66 extending laterally through a slot 67 communicating with the bore.

In operation, a great saving in time and expense is realized in doing body and fender work with the present device, because it enables straightening dented door panels and body panels from the outside, without removal of the interior upholstering, the removal and replacement of which accounts for a large percentage of the total time that must be estimated in any repair job done the old way without this device. The present device, being light, can be handled easily by the workman and placed on the work quickly in the proper position with respect to the damaged area to be fixed, the legs 9 being adjusted quite close together near opposite ends of support 11 where the dented area is rather small and the pulling outwardly on the dented portion of a panel can therefore be done best with the rod 12 in closely spaced relation to these supporting legs. Only rarely will the legs 9 be set at the remote ends of the frame. The support 11 may be adjusted to whatever position on the frame 8 best suits the needs of a given job, and the pull-out rod used will have applied thereto the screw 15 in one case, and either screw 15a, or hook 56, or spring tines 57, in another case. In any event, the suction cups 10 assure a firm hold and freedom from marring of the work. The universal adjustability of the legs 9 relative to the frame 8 and the adjustability of the cups 10 on the legs 9 by means of arms 42 makes it possible to mount the frame to best advantage on the work regardless of the location of the damaged portion. While the legs 9 are shown as disposed substantially parallel to one another, they may be turned about the bolts 36 as axes to various positions in actual use of the device. Lateral adjustment, using slots 40, is rarely needed, but the slots 40 are considered essential for universal adjustability of the device. Adjustment of arms 42 is also not necessary very often but this adjustability comes in very handy in the more difficult setups. The operator, once he has the device set up properly and has attached the rod 12 (or any one of 12a—12d) to the work, has the job under nice control as he oscillates the lever 13, and is not apt to over-pull on a dented area and make the repair job worse by so doing. In many cases, more than one connection of the rod with the work is necessary at a given damaged area and it is, therefore, quite an advantage to have the support 11 shiftable on the frame 8 without resetting the latter, to locate the lower end of the rod 12 adjacent the different spots where a pull is to be applied. The operator can accurately control the operating strokes of the lever 13 to suit the needs of each case and, after only a little experience and experimenting with it, will find he cannot get along without this handy device for the more difficult repair jobs.

It is believed the foregoing description conveys a good understanding of the objects and advantages of our invention. The appended claims have been drawn to cover all legitimate modifications and adaptations.

We claim:

1. A metal panel straightener comprising a frame, supporting legs for said frame engageable with the panel at spaced points, a manually oscillatable lever carried on said frame, a pull rod slidably guided in a bearing carried on said frame, said rod being movable endwise in said bearing substantially at right angles relative to said frame, said rod being operatively connectible at one end with a dented portion of said panel to be straightened, one-way clutch means mechanically connecting the aforesaid lever with said rod, and another one-way clutch means mechanically connecting said rod with said frame to hold the rod against return movement after it has been pulled by operation of said lever.

2. A device as set forth in claim 1 wherein the first mentioned one-way clutch means comprises a perforated friction shoe pivotally connected at one end with said lever and having the rod extending through the perforation thereof, and wherein the last-mentioned one-way clutch means comprises a perforated lever pivotally mounted intermediate its ends on said support and having the rod extending through the perforation thereof, said perforated lever and shoe being so arranged with respect to one another that in the manual disengagement of the last mentioned clutch means the first mentioned clutch means is also disengageable.

3. A device as set forth in claim 1 wherein the first mentioned one-way clutch means comprises a perforated friction shoe pivotally connected at one end with said lever and having the rod extending through the perforation thereof, said shoe having spring means normally urging the perforated portion thereof toward said frame to an inclined engaged position, and wherein the last-mentioned one-way clutch means comprises a perforated lever pivotally mounted intermediate its ends on said support and having the rod extending through the perforation thereof, said lever having spring means normally urging the perforated portion thereof toward said frame to engaged position inclined in the opposite direction relative to the aforesaid shoe, said perforated lever and shoe being so arranged with respect to one another that in the manual disengagement of the last mentioned clutch means the first mentioned clutch means is also disengageable.

4. A device as set forth in claim 1 wherein the supporting legs have radially enlarged rubber suction cups on the panel engaging ends thereof for non-marring, non-slipping mounting of the straightener on the panel.

5. A device as set forth in claim 1 wherein each of the supporting legs is of inverted U-form attached by the cross-portion of the U to the frame and has mounted on the panel engaging end of both arms of the U radially enlarged rubber suction cups for non-marring, non-slipping mounting of the straightener on the panel.

6. A device as set forth in claim 1 wherein said frame is of elongated form and said supporting legs are adjustable on the opposite end portions of the frame toward and away from each other longitudinally with respect to said frame.

7. A device as set forth in claim 1 wherein said frame is of elongated form and said supporting legs are of inverted U-form and attached by the cross-portion of the U to the opposite end portions of said frame and adjustable pivotally as well as lengthwise relative to the frame.

8. A device as set forth in claim 1 wherein said frame is of elongated form, said device including a saddle element slidably supported on said frame for adjustment endwise with respect to said frame and the supporting legs, said saddle element having the manually oscillatable lever mounted thereon along with the bearing for the pull rod and the last mentioned one-way clutch means.

9. A device as set forth in claim 1 wherein said frame is of elongated form, said device including a saddle element slidably supported on said frame for adjustment endwise with respect to said frame and the supporting legs, said saddle element having the manually oscillatable lever mounted thereon along with the bearing for the pull rod and the last mentioned one-way clutch means, and manually adjustable means for exerting variable friction drag on the sliding movement of said support relative to said frame.

10. A device as set forth in claim 1 wherein said frame is of elongated form and said supporting legs are of inverted U-form and attached by the cross-portion of the U to the opposite end portions of said frame and carry arms adjustably extensible from the outer ends of the arms of the U carrying panel engaging supporting feet.

11. A device as set forth in claim 1 wherein said frame is of elongated form and said supporting legs are of inverted U-form and attached by the cross-portion of the U to the opposite end portions of said frame and adjustable transversely relative to the frame in either direction to shorten or lengthen the effective length of either arm of the U relative to the frame and correspondingly lengthen or shorten the effective length of the other arm of the U relative to the frame.

12. A device as set forth in claim 1 wherein said frame is of elongated form and said supporting legs are of inverted U-form and attached by the cross-portion of the U to the opposite end portions of said frame and adjustable transversely relative to the frame in either direction to shorten or lengthen the effective length of either arm of the U relative to the frame and correspondingly lengthen or shorten the effective length of the other arm of the U relative to the frame, each supporting leg being also adjustable pivotally relative to said frame and endwise with respect to said frame.

13. A device as set forth in claim 1, including a manipulating handle on the other end of said rod remote from the end connectible with the dented portion of the panel to be straightened, the handle being of enlarged diameter in relation to said rod and detachably connected therewith.

References Cited in the file of this patent

UNITED STATES PATENTS

| | | |
|---|---|---|
| 1,004,366 | Cater | Sept. 26, 1911 |
| 1,707,711 | Volpiani | Feb. 12, 1929 |